US012418722B2

United States Patent
Ancora et al.

(10) Patent No.: US 12,418,722 B2
(45) Date of Patent: Sep. 16, 2025

(54) SYSTEM AND METHOD FOR COMPUTING A FINAL IMAGE OF AN AREA SURROUNDING A VEHICLE

(71) Applicant: AMPERE S.A.S, Boulogne Billancourt (FR)

(72) Inventors: Andrea Ancora, Golfe Juan (FR); Fabrizio Tomatis, Saint Laurent du Var (FR)

(73) Assignee: AMPERE S.A.S., Boulogne Billancourt (FR)

( * ) Notice: Subject to any disclaimer, the term of this patent is extended or adjusted under 35 U.S.C. 154(b) by 148 days.

(21) Appl. No.: 18/257,778

(22) PCT Filed: Nov. 26, 2021

(86) PCT No.: PCT/EP2021/083198
§ 371 (c)(1),
(2) Date: Jun. 15, 2023

(87) PCT Pub. No.: WO2022/128413
PCT Pub. Date: Jun. 23, 2022

(65) Prior Publication Data
US 2024/0107169 A1    Mar. 28, 2024

(30) Foreign Application Priority Data
Dec. 17, 2020 (FR) ..................... 20 13460

(51) Int. Cl.
*H04N 23/698* (2023.01)
*G06T 3/08* (2024.01)
(Continued)

(52) U.S. Cl.
CPC ........... *H04N 23/698* (2023.01); *G06T 3/08* (2024.01); *G06T 3/4038* (2013.01); *G06T 5/50* (2013.01);
(Continued)

(58) Field of Classification Search
CPC ........... G06T 3/08; G06T 5/80; G06T 3/4038; G06T 5/50; G06T 2207/10028; G06T 2207/30261
See application file for complete search history.

(56) References Cited

U.S. PATENT DOCUMENTS

| | | | |
|---|---|---|---|
| 2010/0103264 A1* | 4/2010 | Nagao | H04N 7/181 348/148 |
| 2014/0247358 A1* | 9/2014 | Takeda | G06T 5/80 348/148 |

(Continued)

OTHER PUBLICATIONS

International Search Report issued Mar. 9, 2022 in PCT/EP2021/083198, filed on Nov. 26, 2021, 2 pages.

(Continued)

*Primary Examiner* — Mohamed A. Wasel
(74) *Attorney, Agent, or Firm* — Oblon, McClelland, Maier &Neustadt, L.L.P.

(57) ABSTRACT

A method computes a final image of an area surrounding a vehicle, from at least one image captured in a first angular portion of the area surrounding the vehicle by a camera and a distance between the vehicle and a point in the surrounding area, which distance is determined, in a second angular portion located in one of the first angular portions, by at least one measurement sensor. The method includes capturing an image and, for each captured image, correcting a distortion in the captured image to generate a corrected image; for each corrected image, transforming the perspective of the corrected image using a matrix storing a pre-calculated distance between the camera and a point in the corresponding surrounding area; and adding the transformed images to obtain the final image. The perspective transforming includes adjusting the pre-calculated distance to the distance determined by the measurement sensor.

9 Claims, 2 Drawing Sheets

(51) Int. Cl.
  *G06T 3/4038*  (2024.01)
  *G06T 5/50*    (2006.01)
  *G06T 5/80*    (2024.01)

(52) U.S. Cl.
  CPC ...... *G06T 5/80* (2024.01); *G06T 2207/10028* (2013.01); *G06T 2207/30261* (2013.01)

(56) References Cited

U.S. PATENT DOCUMENTS

| | | | | |
|---|---|---|---|---|
| 2016/0148062 | A1* | 5/2016  | Fürsich   | H04N 23/698 |
|              |     |         |           | 348/36      |
| 2017/0006221 | A1* | 1/2017  | Cheng     | G06T 7/33   |
| 2018/0316857 | A1* | 11/2018 | Chen      | H04N 17/002 |
| 2019/0349571 | A1  | 11/2019 | Herman et al. | |
| 2020/0112675 | A1* | 4/2020  | Arbeiter  | G06T 15/205 |
| 2020/0126179 | A1  | 4/2020  | Yan et al. | |
| 2020/0410634 | A1  | 12/2020 | Yan et al. | |
| 2022/0148138 | A1* | 5/2022  | Nakayama  | H04N 23/698 |
| 2022/0302577 | A1* | 9/2022  | Kawasaki  | H01Q 21/28  |

OTHER PUBLICATIONS

French Preliminary Search Report & Written Opinion Issued Sep. 7, 2021 in French Application 20 13460 filed on Dec. 17, 2020 (with English Translation of Categories of Cited Documents), 11 pages.

\* cited by examiner

SYSTEM AND METHOD FOR COMPUTING A FINAL IMAGE OF AN AREA SURROUNDING A VEHICLE

The invention relates in general to visual surveillance systems, and in particular to a device and a method for computing a final image of an environment of a vehicle.

In the context of automotive driving assistance technology (better known by the acronym ADAS for advanced driver-assistance system), the bird's eye view is a visual surveillance system that provides a 360 degree top-down view of the environment around the vehicle. The main purpose of this system is to help the driver to park the vehicle in complete safety. However, it may also be used for lane departure and obstacle detection. This system normally comprises two, four or six what are called fish-eye cameras mounted around the automobile in order to provide right, left, front and rear views of the environment of the automobile.

A fish-eye lens is a lens that has the feature of having an extremely short focal length. The impact of this very short focal length has a direct effect on the field angle, which becomes very wide. Using a fish-eye camera results in a strongly curving distortion effect on all straight lines that do not pass through the center.

Processing the bird's eye view traditionally comprises the following steps:

Image capture: in this step, the images from the available panoramic vision cameras are read;

Frame resizing: the captured images are larger than necessary, and they are therefore normally resized;

Lens distortion removal: automotive cameras normally have a wide-angle field of view (greater than 150 degrees). This wide angle poses problems because images may be distorted due to the unequal focal length of the lens as a function of the region of the image, and this phenomenon may be attributed solely to the lens. The lens distortion removal operation compensates for this aberration;

Perspective transformation: there is a major perspective effect on the cameras for the panoramic view. These effects lead to difficulties for human perception because they do not allow the driver to accurately measure distance;

Creation of the final image: After having adjusted the perspective, the images from all of the cameras are then added. To create a 360 degree bird's eye view image, the images have to be joined together by merging overlapping regions;

Displaying the results: the final image resulting from the transformation of all of the input cameras is then available for display on a human-machine interface to the driver.

The perspective transformation operation implies knowing the three-dimensional characteristics of the environment. These characteristics are not available with state-of-the-art camera-based approaches and, in the prior art, the three-dimensional environment is traditionally assumed to be constant. In particular, the 3D environment is often precomputed to be a flat surface onto which the image is projected. The reference flat surface is generally the ground. This assumption is correct for elements of the image whose pixels are on the ground (for example line markings). On the other hand, for elements of the environment that are not on the ground, such as pedestrians or any other tall object, the projection onto the ground creates a distortion. This distortion may be likened to the phenomenon of shadow casting: a tall object is stretched as though it were spread out on the ground. This distortion leads to uncomfortable image perception for the driver, because deformed tall objects do not adhere to the same proportions as elements actually on the ground.

The invention aims to overcome all or some of the problems cited above by proposing a solution that is capable of better modeling the 3D environment of the vehicle and compensating for the deformation of tall objects located in the space surrounding the vehicle. This results in a more accurate final image of the environment, or portion of the environment, of the vehicle, thereby allowing the driver to better assess the elements surrounding his vehicle and thus navigate in the environment in complete safety.

To this end, one subject of the invention is a method for computing a final image of an environment of a vehicle, said method being implemented in the vehicle, based on data from a perception system on board the vehicle, the perception system comprising:

At least one panoramic vision camera, each positioned on the vehicle and configured to capture at least one image in a first angular portion of the environment of the vehicle;

at least one measurement sensor configured to determine a distance between the vehicle and a point of the environment in a second angular portion located in one of the first angular portions of the environment of the vehicle;

said method comprising:

for each camera, a step of capturing an image so as to generate a captured image of the environment located in the first angular portion associated with said camera, said captured image exhibiting a distortion compared to a distortion-free image of the environment;

for each captured image, a step of correcting the distortion in the captured image so as to generate a corrected image;

for each corrected image, a step of transforming the perspective of the corrected image based on a matrix storing, for each pixel of the corrected image, a pre-computed distance between said camera and a point of the environment corresponding to said pixel projected onto a reference surface so as to generate a transformed image;

a step of adding the transformed images from the at least one camera so as to obtain the final image;

and the perspective transformation step furthermore comprising a step of updating, for at least part of the matrix, the precomputed distance with the distance determined by the measurement sensor.

Advantageously, with the perception system comprising a human-machine interface able to display an image, the computing method according to the invention furthermore comprises a step of displaying the final image on the human-machine interface.

Advantageously, the computing method according to the invention furthermore comprises, after the image capture step for at least one of the captured images, a step of resizing the captured image.

Advantageously, the perspective transformation step furthermore comprises a step of extruding a region of the second angular portion into a sector oriented by a predefined angle with respect to the reference surface, said region being positioned at the distance determined by the at least one measurement sensor.

Advantageously, with the distortion in the captured image originating from the lens of the camera, the method according to the invention comprises, prior to the distortion correction step, a step of characterizing the features of the lens.

The invention also relates to a computer program product, said computer program comprising code instructions for performing the steps of the detection method according to the invention when said program is executed on a computer.

The invention also relates to a perception system on board a vehicle for the purpose of computing a final image of an environment of a vehicle, the perception system comprising:

At least one panoramic vision camera, each positioned on the vehicle and configured to capture, for each camera, at least one image in a first angular portion of the environment of the vehicle;

at least one measurement sensor configured to determine a distance between the vehicle and a point of the environment in a second angular portion located in one of the first angular portions of the environment of the vehicle;

a computer able to:
  i. for each captured image, remove the distortion in the captured image so as to generate a corrected image;
  ii. for each corrected image, transform the perspective of the corrected image based on a precomputed matrix storing, for each pixel of the corrected image, the precomputed distance between said camera and a point of the environment corresponding to said pixel projected onto a reference surface so as to generate a transformed image;
  iii. add the transformed images from the at least one camera so as to obtain the final image.

Advantageously, the perception system according to the invention furthermore comprises a human-machine interface able to display the final image.

Advantageously, the measurement sensor comprises a sonar, a lidar, a 2D or 3D radar, and/or a computerized module for estimating distance based on images, alone or in combination.

The invention also relates to a vehicle comprising such a perception system.

Other features, details and advantages of the invention will become apparent on reading the description given with reference to the appended drawings, which are given by way of example and in which:

FIG. 1 schematically shows a vehicle equipped with a perception system according to the invention;

Figure 1:
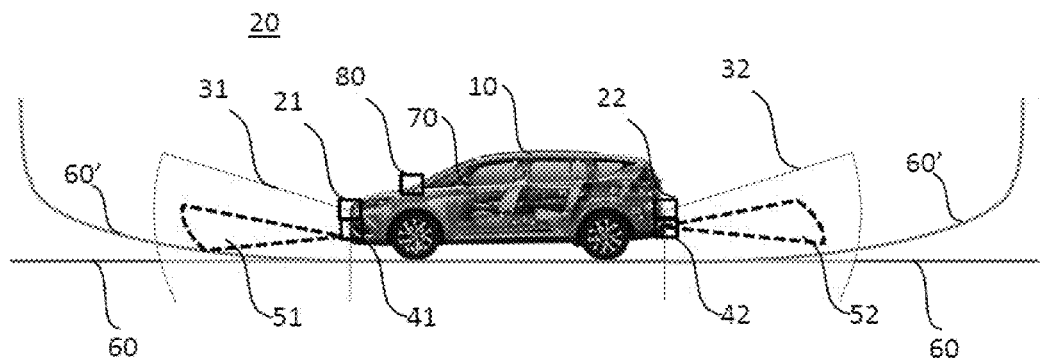

FIG. 1 schematically shows a vehicle 10 equipped with a perception system 20 according to the invention. The perception system 20 is on board a vehicle 10 for the purpose of computing a final image of an environment of a vehicle 10. According to the invention, the perception system 20 comprises:

At least one panoramic vision camera 21, 22, each positioned on the vehicle 10 and configured to capture, for each camera 21, 22, at least one image in a first angular portion 31, 32 of the environment of the vehicle 10;

at least one measurement sensor 41, 42 configured to determine a distance between the vehicle 10 and a point of the environment in a second angular portion 51, 52 located in one of the first angular portions 31, 32 of the environment of the vehicle;

a computer 80 able to:
  i. for each captured image, remove the distortion in the captured image so as to generate a corrected image;
  ii. for each corrected image, transform the perspective of the corrected image based on a precomputed matrix storing, for each pixel of the corrected image, a precomputed distance between said camera and a point of the environment corresponding to said pixel projected onto a reference surface 60, generally the ground on which the vehicle 10 is moving, so as to generate a transformed image;
  iii. add the transformed images from the at least one camera so as to obtain the final image.

Such a perception system according to the invention makes it possible to implement a more accurate perspective transformation of the captured images, by enriching the capture of the image frames using information from the measurement sensors. The details of the principle of the computing method are explained below.

By virtue of the invention, the perception system 20 is able to accurately identify any obstacle in the environment of the vehicle. The obstacles may be, by way of example and without limitation:

objects in the environment of the vehicle 10, which may include fixed or moving objects, vertical objects (for example traffic lights, road signs, etc.), pedestrians, vehicles, and/or road infrastructures.

The invention makes it possible to generate a final image representative of the 3D environment of the vehicle. The driver of the vehicle, by virtue of the display of the obtained final image, is able to understand the environment of his vehicle better, without distortion. The final image offers a faithful representation of the three-dimensional space of the vehicle. The invention may be applied to particular advantage, but without being limited thereto, to the detection of obstacles of pedestrian or vehicle type that could generate a collision with the vehicle. By visualizing the presence of an obstacle in the environment of the vehicle 10 in which the invention is implemented, the invention makes it possible to avoid the collision between the obstacle and the vehicle 10 by taking the necessary measures such as braking the vehicle 10, modifying its own trajectory, or even outputting an acoustic and/or visual signal or any other type of signal intended for the identified obstacle.

Advantageously, the perception system 20 furthermore comprises a human-machine interface 70 able to display the final image. The human-machine interface may in particular be a screen positioned close to the driving position. The final image is thus displayed on this screen, and the driver of the vehicle thus has a final image of the environment of the vehicle that allows him to make decisions and to maneuver in complete safety by checking, by virtue of the display of the final image, that there is no obstacle (object or pedestrian, cyclist, etc.) in the environment of the vehicle. As will be explained below, the obtained final image is compensated for in terms of deformation of tall objects located in the space surrounding the vehicle 10. This results in a more accurate final image of the environment or portion of the environment of the vehicle. The driver is thus able to assess the elements surrounding his vehicle in a relevant manner and thus navigate in the environment in complete safety.

The measurement sensor 41, 42 of the perception system 20 may comprise a sonar, a lidar, a 2D or 3D radar, and/or a computerized module for estimating distance based on images, alone or in combination.

Sonar (acronym for sound navigation and ranging) is a device that uses the particular properties of the propagation of sound in its environment to detect and locate objects by indicating their direction and their distance. Sonar is an ultrasonic sensor that emits short high-frequency sound pulses at regular intervals. These pulses propagate through air at the speed of sound. When they encounter an object, they reflect and return to the sensor in the form of an echo. Said sensor then computes the distance between itself and the target on the basis of the time elapsed between the emission of the signal and the reception of the echo. In other words, it is the propagation time of the ultrasound that determines the distance, independently of the intensity of the ultrasound. Practically any sound-reflecting material may be detected, thereby making the use of such a sensor particularly beneficial for distance determination in a vehicle environment. Ultrasonic sensors are available for ranges from a few millimeters up to several meters, and give the measured value very accurately, to the order of a millimeter or less. Ultrasonic sensors are also able to determine distances even through dusty air or in the presence of fog. Vehicles are generally equipped with a plurality of sonar sensors. It is therefore particularly advantageous to use the distance information that they are able to provide to enable implementation of the invention.

As an alternative or in addition to the sonar, the measurement sensor may be a lidar. Lidar (abbreviation for light imaging detection and ranging) is a technology for measuring distance between the lidar and an object. Lidar measures the distance to an object by illuminating it with pulsed laser light and by measuring the reflected pulses with a sensor. In the context of the invention, the lidar sends light energy into its environment, that is to say 360°, all around the vehicle 10. This emitted light may be called a beam or a pulse. If there is an obstacle in the environment of the vehicle 10, the light emitted toward the obstacle is reflected toward the lidar and the lidar measures the light reflected toward a sensor of the lidar. This reflected light is called an echo or return. The spatial distance between the lidar and the contact point on the obstacle is computed by comparing the delay between the pulse and the return. In the presence of an obstacle in the environment of the vehicle 10, the lidar makes it possible to have a distance between the nearby obstacle and the vehicle. For example, if there is another obstacle (for example one obstacle on the left and one obstacle on the right of the vehicle), the lidar makes it possible to have two distances, one corresponding to the obstacle on the left and another corresponding to the obstacle on the right.

Similarly, the measurement sensor may comprise a 2D or 3D radar. It may also comprise a computerized module for estimating distance based on images. Such a module implements an algorithm for determining distance based on images, such as a neural network, optical flow or stereo vision.

As already mentioned, geometric aberrations may occur on images captured using cameras equipped with wide-angle lenses. These aberrations are generally visible on the edges of images, curving lines that are straight in reality. This optical distortion is particularly present with panoramic vision camera lenses (the distortion is of the order of 16%). Traditionally, this distortion appears on the image that is delivered to the driver of a vehicle. It leads to uncomfortable image perception for the driver. Indeed, tall objects are deformed, and their representation in the traditional image does not adhere to the real proportions. This may result in an incorrect judgement of the distance between the vehicle and the object by the driver. The method therefore aims to provide a solution that makes it possible to correct this incorrect perception using an appropriate transformation that takes into account the three-dimensional content of the environment of the vehicle. The steps of the method are detailed below in the description of the computing method according to the invention based on FIG. 2.

Figure 2:
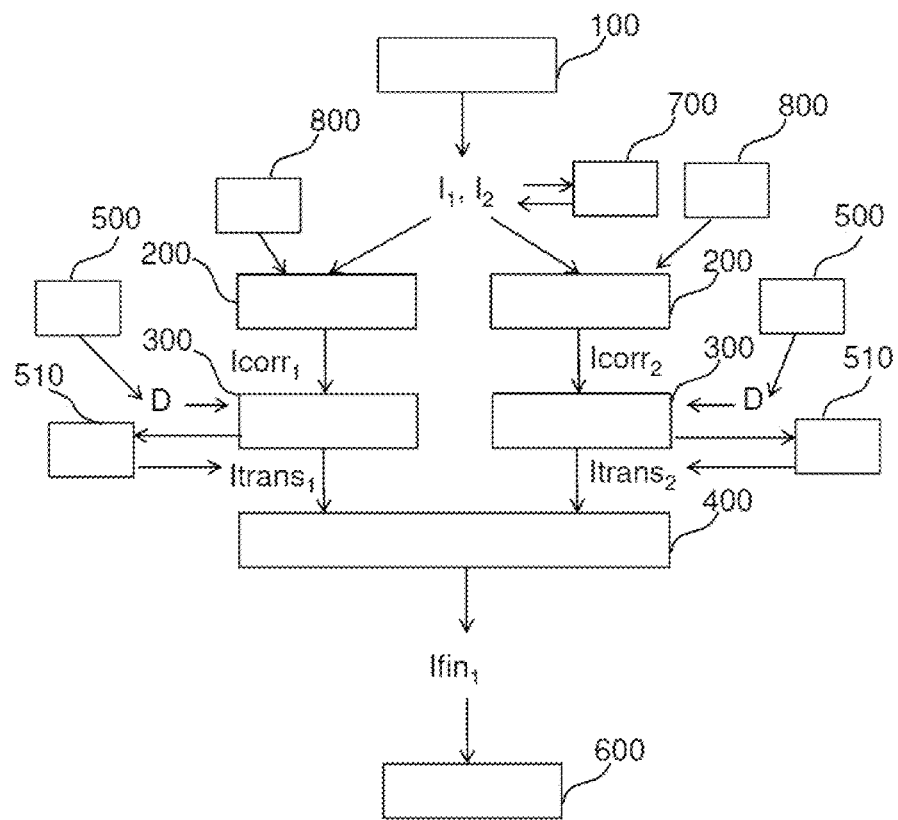
FIG. 2 is a flowchart showing the method for computing a final image of an environment of the vehicle according to the invention.

FIG. 2 is a flowchart showing the method for computing a final image of an environment of the vehicle according to the invention. The method for computing a final image Ifin$_1$ of an environment of a vehicle 10 is intended to be implemented in the vehicle 10, based on data from a perception system 20 on board the vehicle 10. As presented above, the perception system 20 comprises:

At least one panoramic vision camera 21, 22, each positioned on the vehicle 10 and configured to capture at least one image $I_1$, $I_2$ in a first angular portion 31, 32 of the environment of the vehicle 10;

at least one measurement sensor 41, 42 configured to determine a distance $d_1$, $d_2$ between the vehicle 10 and a point of the environment in a second angular portion 51, 52 located in one of the first angular portions 31, 32 of the environment of the vehicle.

For the sake of ease of understanding, reference is made in this description to one or two cameras of the perception system 20. In the case of a single camera, only a portion of the environment may be captured. Advantageously, the perception system comprises multiple cameras each generating captured images and for which the computing method according to the invention is implemented.

Likewise, the method according to the invention is explained with two measurement sensors 41, 42. The invention may be applied at least with a single measurement sensor, and advantageously with multiple measurement sensors so as to allow good meshing of the 3D environment and therefore better determination of the distances between the vehicle and the obstacles around the vehicle.

The method for computing a final image of a portion of the environment of the vehicle 10 is described on the basis of FIG. 2, to be compared with FIG. 1 to aid understanding of the elements involved in the steps of the method.

The computing method according to the invention comprises:

for each camera 21, 22, a step 100 of capturing an image so as to generate a captured image $I_1$, $I_2$ of the environment located in the first angular portion 31, 32 associated with said camera, said captured image $I_1$, $I_2$ exhibiting a distortion compared to a distortion-free image of the environment;

for each captured image $I_1$, $I_2$, a step 200 of correcting the distortion in the captured image so as to generate a corrected image Icorr$_1$, Icorr$_2$;

for each corrected image Icorr$_1$, Icorr$_2$, a step 300 of transforming the perspective of the corrected image Icorr$_1$, Icorr$_2$ based on a matrix D storing, for each pixel of the corrected image Icorr$_1$, Icorr$_2$, a precomputed distance dcalc$_1$, dcalc$_2$ between said camera 21, 22 and a point of the environment corresponding to said pixel projected onto a reference surface 60 so as to generate a transformed image Itrans$_1$, Itrans$_2$;

a step 400 of adding the transformed images Itrans$_1$, Itrans$_2$ from the at least one camera 21, 22 so as to obtain the final image Ifin$_1$.

According to the invention, the perspective transformation step 300 furthermore comprises a step 500 of updating, for at least part of the matrix D, the precomputed distance dcalc1, dcalc2 with the distance $d_1$, $d_2$ determined by the measurement sensor 41 and/or 42. The step 500 of updating the distance matrix associated with each pixel of the image is crucial for better consideration of the three-dimensional aspect of the environment. It makes it possible to correct the bias of a matrix that models a flat reference surface 60 (or even a surface having a slight curvature, such as the surface 60' shown in FIG. 1) and that results in a constant and precomputed shape, independently of the real three-dimensional environment in which the vehicle 10 is moving. This transformation step 300 will be subject to a more detailed description below.

Advantageously, the perception system 20 comprises a human-machine interface 70 able to display an image, and in which case the method according to the invention furthermore comprises a step 600 of displaying the final image Ifin1 on the human-machine interface 70. The display of the final image representative of the environment of the vehicle allows the driver of the vehicle to understand the environment of the vehicle better. This results in better safety for the driver and any passengers, as well as for the surrounding space.

The computing method according to the invention may furthermore comprise, after the image capture step 100 for at least one of the captured images I1, I2, a step 700 of resizing the captured image I1, I2. If the captured images are larger than necessary for their subsequent processing, the resizing step 700 makes it possible to obtain images with the correct dimensions for the subsequent steps of the method.

The distortion in the captured image originates from the lens of the camera 21, 22. Camera lenses are not uniform, thereby introducing fish-eye aberrations into the image. These aberrations occur especially on the edges of the image because the thickness of the lens is less regular on the edges. The image distortion is therefore linked to the intrinsic features of the camera, and especially of the lens. It is necessary to compensate for the intrinsic parameters of the camera. To this end, the method according to the invention may comprise, prior to the distortion correction step 200, a step 800 of characterizing the features of the lens. This characterization step 800 may be carried out just once in the life of a camera, or else it may be performed at more or less regular intervals so as to ensure good correction of distortions over time. The characterization step 800 is generally based on data from the camera supplier. It is also conceivable to obtain these features via the use of specific instruments known to those skilled in the art, such as a checkerboard on which the straight lines of an image are calibrated. The distortion correction step 200 consists in compensating for the intrinsic parameters of the camera.

Figure 3:
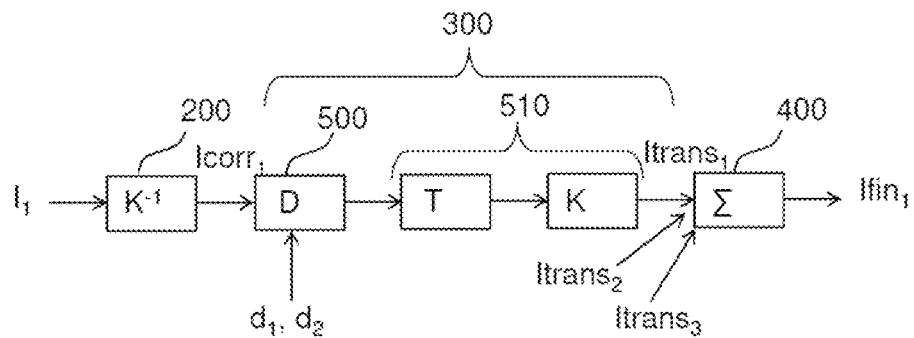
FIG. 3 shows the steps of the method for computing a final image according to the invention.

FIG. 3 shows the steps of the method for computing a final image according to the invention. An image $I_1$ is captured. The image $I_1$ has applied to it the step 200 of correcting the distortion in the captured image so as to generate a corrected image $Icorr_1$. This is followed by the perspective transformation step 300, which is specific to the invention. The perspective transformation 300 is more accurate than a perspective transformation from the prior art, by virtue of the enrichment of the capture of the image frames using information from the measurement sensors. In other words, the method according to the invention provides additional information in the computing of the final image by retrieving data regarding distances between the vehicle and the three-dimensional objects in the environment, in order to take into account the height of these objects and to allow faithful visual rendering thereof in the final image. The computing method according to the invention may be summarized as follows:

$$p_t = \Sigma K_t T_{s \to t} D(p_s) K_s^{-1} p_s$$

$p_t$ and $p_s$ being the homogeneous coordinates of a target pixel and of a source pixel, respectively, $K_t$ and $K_s$ being the intrinsic matrices of the lens (that is to say the transformation effecting the distortion of the lens), D being the depth map, that is to say the matrix storing the focal length of the camera at a 3D point for each pixel $p_s$, $T(s \to t)$ being the rigid transformation that makes it possible, over time, to provide the same absolute 3D reference to the pixels of all of the cameras, and $\Sigma$ is the final fusion/addition operation that creates an overall bird's eye view from all of the pixels of all of the available cameras.

As may be seen, the matrix D takes into account the distance information provided by the one or more measurement sensors, of sonar or other type. This updating of the information in the matrix D provides better consideration of the ground truth.

Figure 4:
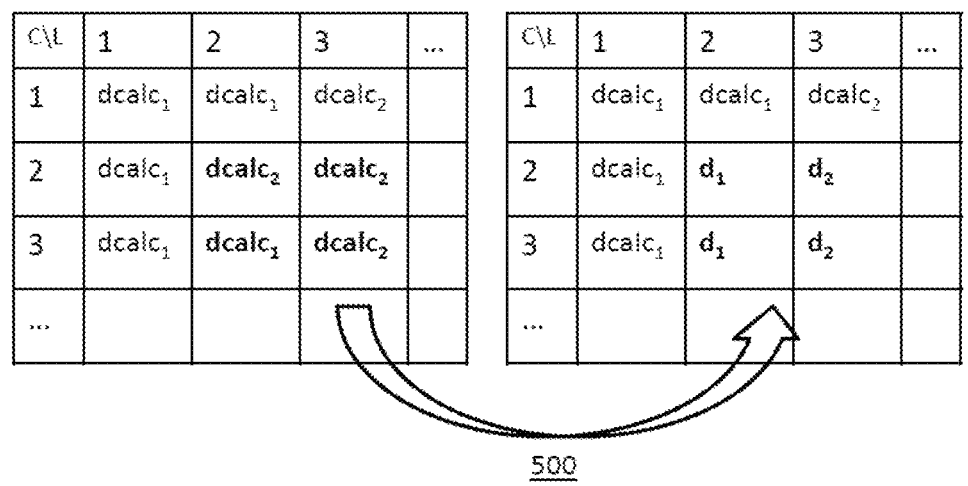
FIG. 4 illustrates, in more detail, the perspective transformation step of the method for computing a final image according to the invention.
Figure 4:
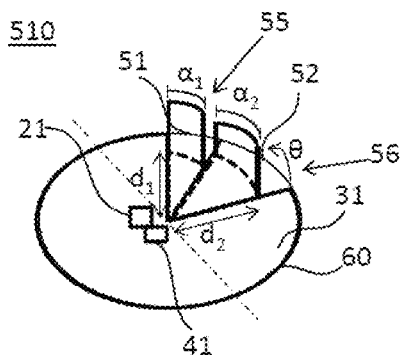

FIG. 4 illustrates, in more detail, the perspective transformation step 300 of the method for computing a final image according to the invention. The matrix D is shown with only 3 rows and 3 columns. Obviously, this matrix comprises far more rows and columns in accordance with the number of pixels of the image under consideration. The matrix D stores, for each pixel, a precomputed distance ($dcalc_1$, $dcalc_2$) between said camera 21, 22 and a point of the environment corresponding to said pixel projected onto a reference surface 60. In the invention, instead of considering only a constant and precomputed surface, the 3D shape is computed online using the measurement sensor, preferably the sonar sensors that are already commonly on board the vehicle, so as to better model the 3D environment and compensate for the deformation of tall objects located in the space surrounding the vehicle.

In other words, first of all, a precomputed matrix D is considered (whether this be flat with reference to the ground 60 or bowl-shaped with reference to the bowl 60'). This is the matrix shown in the left-hand part of the figure. An update is then performed (step 500) on this matrix D based on the distance data provided by the measurement sensor. This then gives the updated matrix shown in the right-hand part of the figure. Thus, by incorporating information from a distance measurement sensor, such as a sonar, it is possible to compute new 3D surfaces.

For a better representation of three-dimensional objects in the final image, the perspective transformation step 300 furthermore comprises a step 510 of extruding a region 55, 56 of the second angular portion 51, 52 into a sector oriented by a predefined angle θ with respect to the reference surface 60, said region 55, 56 being positioned at the distance $d_1$, $d_2$ determined by the at least one measurement sensor 41, 42.

First of all, the flat surface represents the precomputed ground (reference surface 60). Then, by virtue of the distance information from the measurement sensor, we have the information that, in a second angular portion 51, an obstacle is located at a distance $d_1$ from the vehicle. The region 55, that is to say the portion of the second angular portion 51 located beyond the distance $d_1$ with respect to the vehicle, is extruded by a predefined angle of inclination θ. The inclination is controlled by an angle called visual comfort angle θ. The angle of inclination θ may be adjusted in a calibration phase or by other means (as a function of the height of the object). This angle is chosen to be between 0° and 90°. It may be predefined or adapted depending on the situation. Its value may in particular vary depending on the distance from the region 55 to the vehicle. This extrusion makes it possible to take into account the three-dimensional aspect of the surrounding objects when computing the final image.

Sonar sensors are often discrete and placed in a number sufficient to cover 360 degrees around the vehicle; their number and their specific azimuth field of view determine the angular sector α that they cover.

Following the extrusion step, a quasi-vertical surface (depending on the chosen angle of inclination) arises on the surface of the ground at a point $d_1$ away from the origin (for example, the center) of the automobile. The distance $d_1$ corresponds to the distance measurement from the sensor (for example sonar) processing a specific angular sector.

If a measurement sensor does not provide any distance measurement, this means that there is no obstacle in the surrounding region under consideration, and the sector is then not adapted and the precomputed surface is used.

This updating and extrusion step is performed for each measurement sensor available on the vehicle.

The invention allows a more faithful reconstruction of the bird's eye view when large objects are present in the surroundings of the vehicle. This invention allows better comfort and better reliability in terms of estimating distances from these objects so as to facilitate maneuvers.

Although they are not limited to such applications, the embodiments of the invention are particularly advantageous for implementation in motor vehicles. However, the invention may be applied to any land-based, sea-based or air-based system, including surveillance systems.

The invention also relates to a computer program product, said computer program comprising code instructions for performing the steps of the method according to the invention as described above when said program is executed on a computer.

Those skilled in the art will understand that the system or subsystems according to the embodiments of the invention may be implemented in various ways by way of hardware, software, or a combination of hardware and software, in particular in the form of program code able to be distributed in the form of a program product, in various forms. In particular, the program code may be distributed using computer-readable media, which may include computer-readable storage media and communication media. The methods described in this description may in particular be implemented in the form of computer program instructions able to be executed by one or more processors in a computing device. These computer program instructions may also be stored in a computer-readable medium.

Moreover, the invention is not limited to the embodiments described above by way of non-limiting example. It encompasses all variant embodiments that might be envisaged by those skilled in the art. In particular, those skilled in the art will understand that the invention is not limited to particular types of sensors of the perception system, nor to a particular type of vehicle (examples of vehicles include, without limitation, automobiles, trucks, buses, etc.).

The invention claimed is:

1. A method for computing a final image of an environment of a vehicle, said method being implemented in the vehicle, based on data from a perception system on board the vehicle, the perception system comprising:
    at least one panoramic vision camera, each positioned on the vehicle and configured to capture at least one image in a first angular portion of the environment of the vehicle; and
    at least one measurement sensor configured to determine a distance between the vehicle and a point of the environment in a second angular portion located in one of the first angular portions of the environment of the vehicle, said method comprising:
capturing, for each camera, an image so as to generate a captured image of the environment located in the first angular portion associated with said camera, said captured image exhibiting a distortion compared to a distortion-free image of the environment;
correcting, for each captured image, the distortion in the captured image so as to generate a corrected image;
transforming, for each corrected image, the perspective of the corrected image based on a matrix storing, for each pixel of the corrected image, a precomputed distance between said camera and a point of the environment corresponding to said pixel projected onto a reference surface so as to generate a transformed image, the matrix including rows and columns corresponding to a number of pixels in the corrected image where the matrix initially stores precomputed distance values based on a predetermined flat or curved reference surface onto which the corrected image is projected; and
adding, when the perception system comprises more than one camera, the transformed images from the at least one camera so as to obtain the final image,
wherein transforming further comprises updating, for at least part of the matrix, the precomputed distance with the distance determined by the measurement sensor, and
wherein transforming further comprises inclining a region of the second angular portion into a sector oriented by a predefined angle with respect to the reference surface, said region being positioned at the distance determined by the at least one measurement sensor.

2. The computing method as claimed in claim 1, wherein the perception system further comprises a human-machine interface configured to display an image, and said method further comprises displaying the final image on the human-machine interface.

3. The computing method as claimed in claim 1, further comprising, after the capturing, resizing the captured image.

4. The computing method as claimed in claim 1, wherein the distortion in the captured image originates from the lens of the camera, said method further comprising, prior to the correcting, characterizing features of the lens.

5. A non-transitory computer readable medium storing a computer program product, said computer program comprising code instructions for performing the computing method as claimed in claim 1 when said program is executed on a computer.

6. A perception system on board a vehicle to compute a final image of an environment of the vehicle, the perception system comprising:
    at least one panoramic vision camera, each positioned on the vehicle and configured to capture, for each camera, at least one image in a first angular portion of the environment of the vehicle;
    at least one measurement sensor configured to determine a distance between the vehicle and a point of the environment in a second angular portion located in one of the first angular portions of the environment of the vehicle;

one or more processors configured to:
- for each captured image, remove a distortion in the captured image so as to generate a corrected image;
- for each corrected image, transform the perspective of the corrected image based on a precomputed matrix storing, for each pixel of the corrected image, the precomputed distance between said camera and a point of the environment corresponding to said pixel projected onto a predetermined flat or curved reference surface so as to generate a transformed image, the precomputed matrix including rows and columns corresponding to a number of pixels in the corrected image where the precomputed matrix initially stores precomputed distance values based on the predetermined flat or curved reference surface onto which the corrected image is projected; and
- add the transformed images from the at least one camera so as to obtain the final image.

7. The perception system as claimed in claim 6, further comprising a human-machine interface configured to display the final image.

8. The perception system as claimed in claim 6, wherein the measurement sensor comprises a sonar, a lidar, a 2D or 3D radar, and/or a computerized module for estimating distance based on images, alone or in combination.

9. A vehicle comprising:
the perception system as claimed in claim 6.

* * * * *